United States Patent [19]
Sugisaka

[11] 3,891,661

[45] June 24, 1975

[54] PROCESS FOR PREPARATION OF BENZOYLPYRIDINES AND DERIVATIVES

[75] Inventor: Nobuyuki Sugisaka, Cottage Grove, Minn.

[73] Assignee: Riker Laboratories, Inc., Northridge, Calif.

[22] Filed: Feb. 8, 1974

[21] Appl. No.: 440,806

[52] U.S. Cl. ............... 260/297 R; 71/94; 424/263
[51] Int. Cl. .......................................... C07d 31/32
[58] Field of Search ............................... 260/297 R

[56] References Cited
UNITED STATES PATENTS
3,705,169  12/1972  Kaiser et al. ............... 260/297 R X OTHER PUBLICATIONS
Organic Reactions, Vol. V, pp. 388–393, John Wiley and Sons, (1949).
Chemical Abstracts, Vol. 72, Abst. No. 31643c (1972), (abst. of Fr. patent 1,536,543).
Klingsberg, Pyridine and Derivatives, Vol. 4, pp. 123–124, 152–153, and 163–166, Interscience Publishers, N.Y., (1964).

*Primary Examiner*—John D. Randolph
*Attorney, Agent, or Firm*—Alexander, Sell, Steldt & DeLaHunt

[57] ABSTRACT

Benzoylpyridines, which are useful intermediates in the synthesis of certain pharmaceuticals and agrichemicals, are obtained by a process wherein cyanopyridines are reacted with hydroxy or alkoxy substituted benzenes in the presence of a Lewis acid catalyst. Processes for the utilization of these intermediates are also described.

6 Claims, No Drawings

PROCESS FOR PREPARATION OF BENZOYLPYRIDINES AND DERIVATIVES

BACKGROUND OF THE INVENTION

The reaction of benzonitrile with hydroxy and methoxy substituted benzenes is known. It is one variation of the well known Hoesch reaction, described in detail in Organic Reactions Volume V, Chapter 9. In this reference a variety of aliphatic and aromatic nitriles are shown to react with various phenols, anisoles and substituted derivatives thereof. However, so far as is known, the prior art does not suggest the reaction of nitrogen-heterocyclic nitriles with these compounds.

The process of the present invention is particularly useful in the preparation of certain bronchodilating agents described in British Pat. No. 1,316,424, U.S. Pat. No. 3,705,169 and U.S. Pat. application Ser. No. 39,571. The previously described processes for preparing these compounds do not suggest reacting a nitrogen heterocyclic nitrile with an hydroxy or alkoxy substituted benzene. U.S. Pat. No. 3,705,169 suggests the reaction of hydroxy or alkoxy substituted phenol Grignard reagents with 2-cyanopydrine. However, the reaction requires the preparation and use of a highly reactive Grignard reagent, and is not analogous to the process of the present invention.

DETAILED DESCRIPTION OF THE INVENTION

This invention relates to a process for the preparation of benzoylpyridines of the general formula

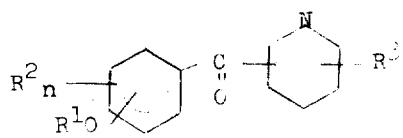

wherein $R^1$ is hydrogen or lower alkyl; $R^3$ is hydrogen, lower alkyl, phenyl, phenyl-lower alkyl, phenoxy-lower alkyl or halogen; n is zero, one or two; and $R^2$ is hydroxy, lower alkoxy or lower alkyl, except that when $R^1$ is hydrogen and n is one, $R^2$ is not hydroxy oriented ortho to $R^1O$.

The process comprises reacting a cyanopyridine of the formula

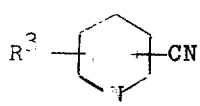

wherein $R^3$ is as defined above, with a benzene derivative of the formula

wherein $R^1$, $R^2$ and n are as defined above, in the presence of a Lewis acid catalyst and hydrogen chloride gas in an inert solvent, at a temperature in the range of about 30° to 210°C, followed by isolation of the product.

As used throughout this application, the terms "lower alkyl" and "lower alkoxy" embrace both straight and branched chain alkyl and alkoxy radicals, respectively, containing from 1 to 4 carbon atoms.

It is presently preferred that the cyano group be oriented ortho to the pyridine nitrogen. It is preferred that $R^3$ is not ortho to the cyano group owing to the possibility of steric interference by the $R^3$ group with the reaction of the cyano group. It is preferred that when cyano is in the (2) position, $R^3$ is in the (6) position, ortho to the pyridine nitrogen.

Suitable Lewis acid catalysts for the reaction are aluminum chloride, zinc chloride, ferric chloride and the like, which are well known to the art. The preferred catalyst is aluminum chloride because of its catalytic strength and ability to maximize yields.

Suitable inert solvents are nitrobenzene, halogenated hydrocarbons such as 1,2-dichloroethane, trichloroethylene and the like, ethers such as diethyl ether, tetrahydrofuran and the like, esters of organic acids such as methyl acetate, and glacial acetic acid.

The reaction should be carried out under anhydrous conditions with approximately equimolar amounts of the benzene derivative and the cyanopyridine reactants. The presence of water may interfere with the reaction by reacting with the catalyst. Dry hydrogen chloride is used to saturate the reaction mixture. It may be necessary to cool the reaction, or in some cases to heat the reaction, depending upon the strength of the Lewis acid catalyst used and the reactivity of the reactants. Generally the reaction is complete within one to twelve hours. The reaction mixture is then hydrolyzed to form the benzoylpyridine product. The hydrolysis may be acidic, for example, dilute hydrochloric acid may be used.

The products are generally basic due to the pyridine nucleus, and are isolated by adjusting the pH of the aqueous hydrolysis reaction mixture with enough base to effect precipitation of the product, followed by filtration or extraction.

The compounds prepared by the process of the present invention are useful intermediates for the preparation of agrichemicals and pharmaceuticals. For example, benzoylpyridines are readily nitrated as shown in the reaction sequence below. The nitro compounds are then reduced catalytically, for example, with palladium on charcoal or Raney nickel, to the corresponding (aminobenzoyl) pyridines. When $R^3$ is alkyl or hydrogen, (aminobenzoyl) pyridines can be reacted with trifluoromethanesulfonyl fluoride to provide agents which modify plant growth, as described in U.S. Pat. No. 3,686,192.

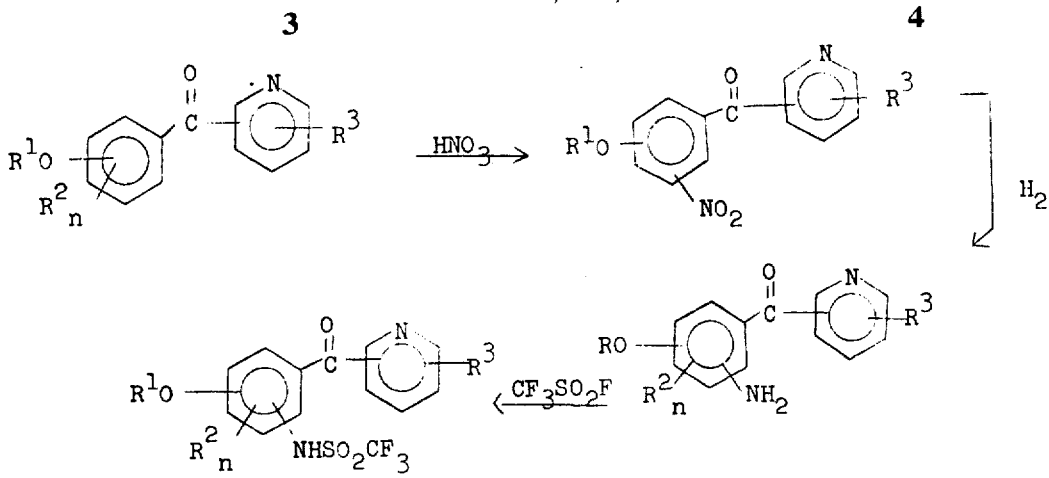

Benzoylpyridines produced by the process of the present invention are readily converted to certain bronchodilators described in British Pat. No. 1,316,424, U.S. Pat. No. 3,705,169 and U.S. Pat. application Ser. No. 39,571. Indeed, the process of this invention provides a particularly preferred method for making these useful pharmaceuticals and becomes an essential step of a new process for their preparation.

The bronchodilators of the British patent hereinabove referred to are of the formula

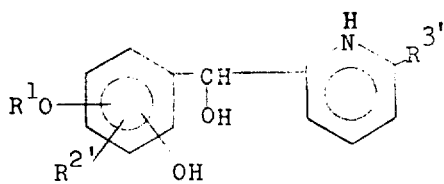

wherein $R^{3'}$ is hydrogen, lower alkyl, phenyl, phenyl-lower alkyl or phenoxy-lower alkyl, $R^1$ is hydrogen or lower alkyl and $R^{2'}$ is hydrogen, hydroxy, lower alkyl or lower alkoxy. The novel process for preparing these compounds comprises the following steps:

Step 1.

Reacting a 2-cyanopyridine of the formula

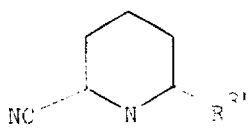

wherein $R^{3'}$ is defined immediately above, with a benzene derivative of the formula

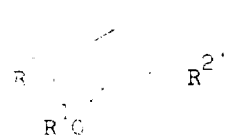

wherein $R^1$ and $R^{2'}$ are as defined immediately above except that no two hydroxy groups may be ortho to each other, in the presence of a Lewis acid catalyst and hydrogen chloride gas in an inert solvent.

Step 2.

Optionally cleaving alkoxy substituents of the phenyl ring by reaction, generally be refluxing, with hydrogen bromide and Step 3.

Hydrogenating the pyridine ring in the presence of a catalyst, for example, Adam's platinum catalyst, Raney nickel, ruthenium, or rhodium in acidic medium.

This three-step process is a further embodiment of the process of the present invention. It is utilized with particular advantage for the preparation of α-(3,4-dihydroxyphenyl)-α-(2-piperidinyl) methanol and salts thereof.

The following examples illustrate the process of the invention and are not intended to limit the scope of the invention as described hereinabove.

EXAMPLE 1

Into a suspension of 30.0 g (0.225 mole) of anhydrous aluminum chloride in 80 g of 1,2-dichloroethane is added 13.8 g (0.100 mole) of veratrole. Addition of veratrole into the suspension of aluminum chloride results in a reddish solution. 2-Cyanopyridine, 10.4 g (0.100 mole), is added with stirring and cooling (ice bath). Dry hydrogen chloride gas is then bubbled into the solution with vigorous stirring and cooling. During these operations the reaction temperature is controlled below 40°C. The hydrogen chloride gas is allowed to bubble slowly into the mixture for 8 hours at room temperature, then the mixture is added to 150 ml of water. The solvent is evaporated under reduced pressure, the aqueous solution is washed with petroleum ether, then made basic (pH 12) with 6N aqueous sodium hydroxide. The precipitated dark colored fine needles are filtered, washed with water, and dried in vacuo to provide 17.8 g (73.3 percent yield) of 2-(3,4-dimethoxybenzoyl)pyridine, m.p. 90°–92°C.

EXAMPLE 2

Into a suspension of 30.0 g (0.225 mole) of anhydrous aluminum chloride in 60 g of nitrobenzene is added 13.8 g (0.100 mole) of veratrole and 10.4 g (0.100 mole) of 2-cyanopyridine with stirring and cooling (ice bath). A reddish solution results. Dry hydrogen chloride gas is then bubbled into the solution with vigorous stirring and cooling. During these operations, the reaction temperature is controlled below 40°C. The hydrogen chloride gas is allowed to bubble slowly into the mixture for 8 hours at room temperature. The reaction mixture is allowed to stand overnight, then the mixture is extracted thoroughly with dilute hydrochloric acid. The acid extracts are then made basic (pH 12) with 6N aqueous sodium hydroxide. The precipitated solid product is 2-(3,4-dimethoxybenzoyl)pyridine (17.4 g, 70.8 percent yield) identical with authentic material by infrared spectral comparison.

EXAMPLE 3

Into a cold suspension of 6.0 g (0.045 mole) of anhydrous aluminum chloride in 12 g of nitrobenzene is added 2.8 g (0.02 mole) of veratrole and 2.2 g (0.02 mole) of 4-cyanopyridine with stirring and cooling (ice bath). Stirring is continued and the ice bath is removed while bubbling in dry hydrogen chloride gas. After about 23 hours at room temperature thin layer chromatography analysis indicates a slow reaction. The reaction mixture is heated at 50°C. for 7 hours, then is stored for an additional 16 hours at room temperature, when the reaction is virtually complete. The reaction mixture is then poured into 50 ml. of water and the mixture cooled to 25°C. The mixture is washed with petroleum ether, then made basic with 6N aqueous sodium hydroxide solution. The precipitated product is isolated by filtration, washed with water and dried under vacuum to provide 2.1 g of light yellow 4-(3,4-dimethoxybenzoyl)-pyridine, m.p. 117°–118°C. Infrared and nuclear magnetic resonance spectral analysis confirm the identity of the product.

EXAMPLE 4

This example describes the utilization of the compound prepared in Examples 1 and 2 to prepare a bronchodilator described in British Pat. No. 1,316,424 by the novel process of the present invention.

Step 1

Preparation of 2-(3,4-dimethoxybenzoyl)pyridine according to Example 1 or 2.

Step 2

2-(3,4-Dimethoxybenzoyl)pyridine (10 g) is dissolved in constant boiling hydrobromic acid (100 ml) and heated under reflux for 3 hours. The dark amber reaction solution is concentrated under reduced pressure, and denatured ethanol is added to, and evaporated from, the residue several times to remove the last traces of water. Crystallization from methanol (300 ml) and ethyl acetate yields 2-(3,4-dihydroxybenzoyl)pyridine hydrobromide, m.p. 225°–226°C.

Step 3

2-(3,4-Dihydroxybenzoyl)pyridine hydrobromide (20 g) in methanol (600 ml) is hydrogenated at room temperature and at atmospheric pressure in the presence of Adam's platinum catalyst (5 g). After theoretical consumption of hydrogen takes place, the catalyst and solvent are removed by evaporation to give a syrup which solidifies on trituration with ethyl acetate (250 ml) and methanol (30 ml).

The solid is collected by filtration, washed with ethyl acetate/methanol (8:1, 50 ml) and dried in vacuo to yield erythro-α-(3,4-dihydroxyphenyl)-α-(2-piperidinyl)methanol hydrobromide, m.p. 220°C (dec.).

Using the process of the invention described in the previous examples the following benzoylpyridines are converted to the corresponding hydroxyphenyl-piperidinylmethanol derivatives which possess bronchodilating activity.

EXAMPLE 5

Step 1

2-(3,4-Dimethoxybenzoyl)-6-methylpyridine, m.p. 84°–86°C.

Step 2

2-(3,4-Dihydroxyphenyl)-6-methylpyridine hydrobromide, m.p. 224°C (dec.).

Step 3

α-(3,4-Dihydroxyphenyl)-α-(6-methyl-2-piperidinyl)methanol hydrobromide, m.p. 216°C (dec.).

EXAMPLE 6

Step 1

2-(3,4,5-Trimethoxyphenyl)pyridine m.p. 111°–112°C.

Step 2

2-(3,4,5-Trihydroxyphenyl)pyridine hydrobromide, m.p. 240°C. (dec.).

Step 3 erytrho-α-(3,4,5-Trihydroxyphenyl)-α-(2-piperidinyl) methanol hydrobromide, m.p. 130°–140°C.

EXAMPLE 7

Using the method of Example 1 and 2 the compound 6-benzyl-2-(3,4-dimethoxybenzoyl)pyridine is prepared from veratrole and 6-benzyl-2-cyanopyridine. 6-Benzyl-2-cyanopyridine is prepared 1) by reaction of 2-bromo-6-methylpyridine with sodium amide in liquid ammonia, reacting the intermediate thereby formed with benzyne prepared from bromobenzene, sodium amide and liquid ammonia to give 6-benzyl-2-bromopyridine, and 2) reacting 6-benzyl-2-bromopyridine with potassium cyanide in dimethylsulfoxide.

6-Benzyl-2-(3,4-dimethoxybenzoyl)pyridine is converted using the method of Example 4 to erythro-α-(3,4-dihydroxyphenyl)-α-(6-benzyl-2-piperidinyl)methanol as the hydrobromide salt.

What is claimed is:

1. A process for the preparation of benzoylpyridines of the formula:

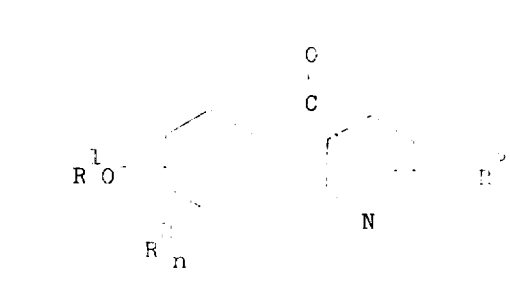

wherein $R^1$ is hydrogen or lower alkyl; n is zero, one or two; $R^3$ is hydrogen, lower alkyl, phenyl, phenyl lower alkyl, phenoxy-lower alkyl or halogen; and $R^2$ is hydroxy, lower alkoxy or lower alkyl, except when $R^1$ is hydrogen and n is one $R^2$ is not hydroxy oriented ortho to -$R^1O$; which comprises reacting a cyanopyridine of the formula

wherein R³ is as defined above, with a benzene derivative of the formula

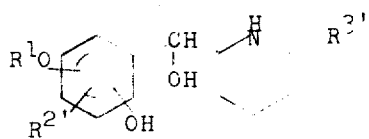

wherein R¹ and R² as are defined above in the presence of a Lewis acid catalyst and hydrogen chloride gas under anhydrous conditions at a temperature between 30°C. and 210°C., in an inert solvent, followed by hydrolysis.

2. The process of claim 1 wherein one reactant is 2-cyanopyridine.

3. The process of claim 1 wherein one reactant is 2-cyanopyridine and the Lewis acid catalyst is aluminum chloride.

4. The process of claim 3 wherein the benzene derivative is veratrole.

5. A process for the preparation of compounds of the formula wherein R³′ is hydrogen, lower alkyl, phenyl, phenyl-lower alkyl, or phenoxy-lower alkyl, R¹ is hydrogen or lower alkyl and R²′ is hydrogen, hydroxy, lower alkyl or lower alkoxy which comprises 1. reacting a 2-cyanopyridine of the formula

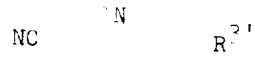

wherein R³′ is as defined immediately above, with a benzene derivative of the formula

wherein R¹ and R²′ are as defined immediately above except that no two hydroxy groups may be ortho to each other, in the presence of a Lewis acid catalyst and hydrogen chloride gas under anhydrous conditions in an inert solvent, at a temperature between 30°C. and 210°C. followed by hydrolysis. 2. optionally cleaving alkoxy substituents of the phenyl ring by reaction with hydrogen bromide. 3. hydrogenating the pyridine ring in the presence of a catalyst.

6. The process of claim 5 wherein 2-cyanopyridine is reacted with veratrole in step 1) the condensation product is cleaved with hydrogen bromide to form 3,4-dihydroxyphenyl 2-pyridyl ketone in step 2) and the ketone is reduced to α-(3,4-dihydroxyphenyl)-α-2-piperidylmethanol in step 3).

* * * * *

UNITED STATES PATENT OFFICE
CERTIFICATE OF CORRECTION

PATENT NO. : 3,891,661
DATED : June 24, 1975
INVENTOR(S) : NOBUYUKI SUGISAKA

It is certified that error appears in the above-identified patent and that said Letters Patent are hereby corrected as shown below:

Col. 1, line 37, formula not readable, should read:

Col. 1, line 57, formula not readable, should read:

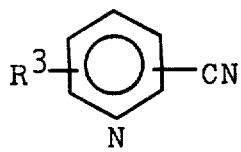

Col. 2, line 4, formula not readable, should read:

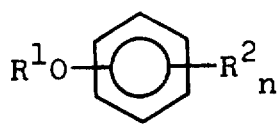

Col. 3, line 47, formula not readable, should read:

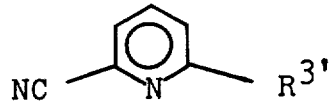

Col. 3, line 55, formula not readable, should read:

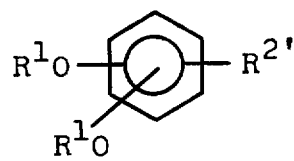

UNITED STATES PATENT OFFICE
CERTIFICATE OF CORRECTION

PATENT NO. : 3,891,661  Page 2
DATED : June 24, 1975
INVENTOR(S) : NOBUYUKI SUGISAKA It is certified that error appears in the above-identified patent and that said Letters Patent are hereby corrected as shown below:

Col. 6, line 55, formula not readable, should read:

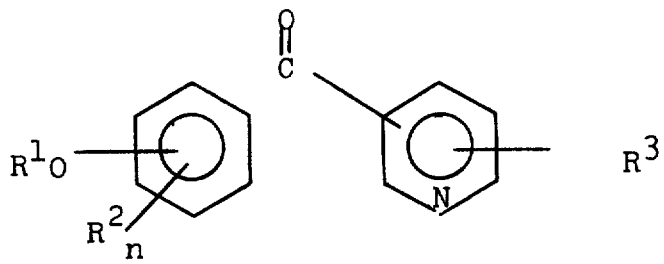

Col. 7, line 3, formula not readable, should read:

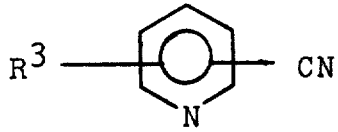

Col. 7, line 10, formula not readable, should read:

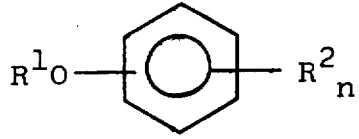

Col. 7, line 33, formula not readable, should read:

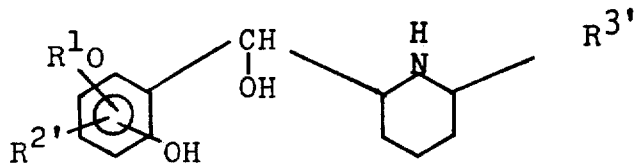

UNITED STATES PATENT OFFICE
CERTIFICATE OF CORRECTION

PATENT NO. : 3,891,661
DATED : June 24, 1975
INVENTOR(S) : NOBUYUKI SUGISAKA

It is certified that error appears in the above-identified patent and that said Letters Patent are hereby corrected as shown below:

Col. 8, line 8, formula not readable, should read:

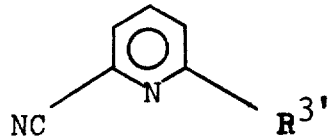

Col. 8, line 20, formula not readable, should read:

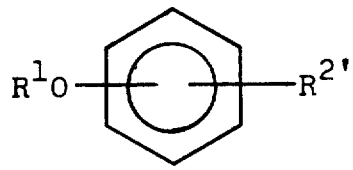

Signed and Sealed this twenty-seventh Day of January 1976

[SEAL]

Attest:

RUTH C. MASON
Attesting Officer

C. MARSHALL DANN
Commissioner of Patents and Trademarks